Dec. 10, 1929.   I. G. FOWLER   1,739,452
GLASSWARE FORMING MEANS
Original Filed Sept. 23, 1926
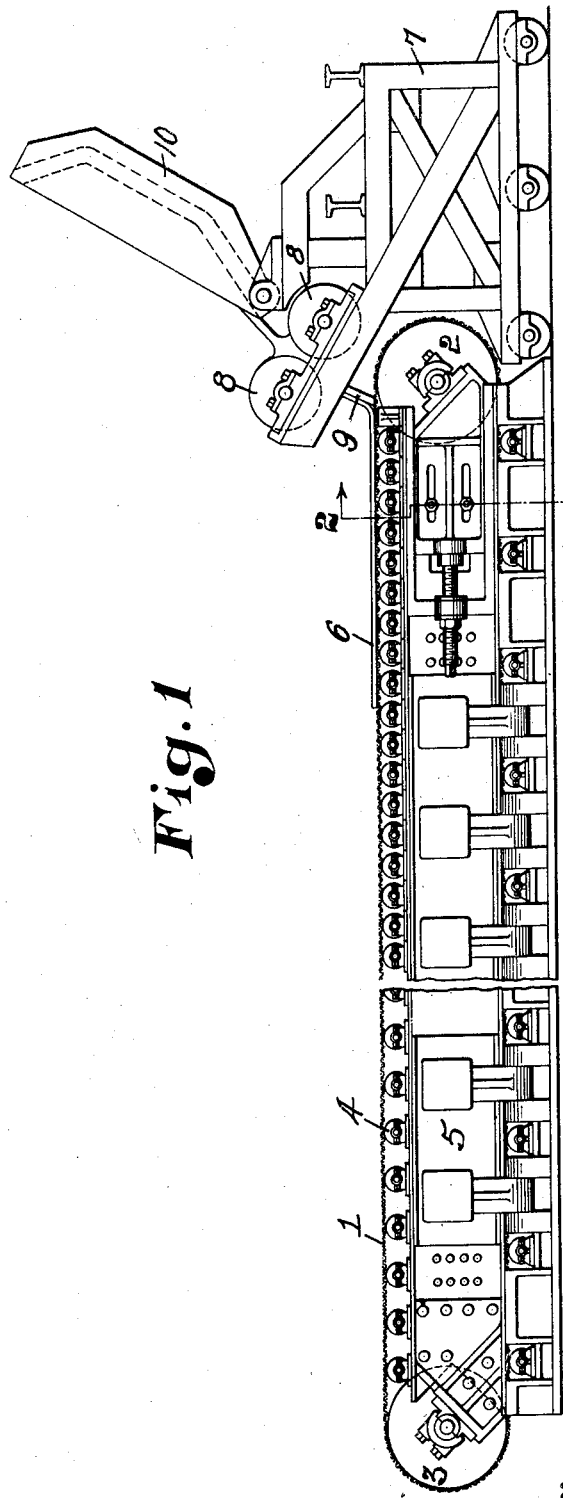
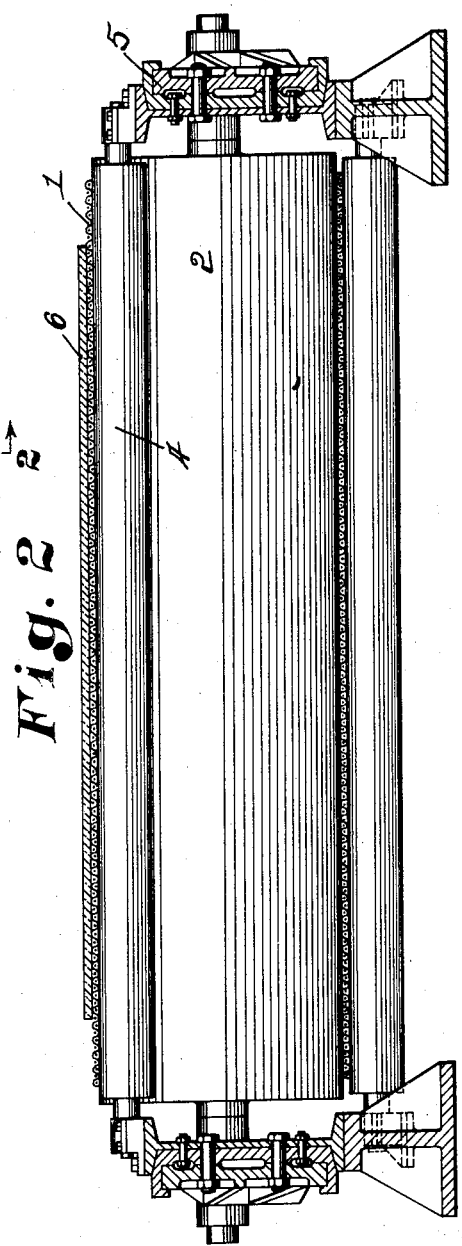
Inventor
Ival G. Fowler
By Owen & Owen
Attorneys Patented Dec. 10, 1929

1,739,452

UNITED STATES PATENT OFFICE

IVAL G. FOWLER, OF TOLEDO, OHIO, ASSIGNOR TO THE EDWARD FORD PLATE GLASS COMPANY, OF ROSSFORD, OHIO, A CORPORATION OF OHIO

GLASSWARE-FORMING MEANS

Original application filed September 23, 1926, Serial No. 137,193. Divided and this application filed September 24, 1928. Serial No. 307,880.

This invention relates to conveyors, and particularly to those adapted for conveying glass in either plate or continuous sheet form, and while in a semi-molten or plastic condition from a forming point to a leer for annealing, the conveying means being in the form of an endless belt.

An object of the invention is the provision in an apparatus of the class described of a conveyor belt of woven wire fabric, whereby it is adapted to withstand the high temperatures of the glass conveyed thereby and to facilitate a substantially uniform cooling of the undersurface of the glass with that of the upper surface due to the open mesh character of the belt.

This application is a division of my prior United States Letters Patent No. 1,688,698, issued October 23, 1928.

While the invention in its broader aspect is capable of embodiment in numerous forms, one embodiment thereof is illustrated in the accompanying drawings, in which, Figure 1 is a side elevation of a conveyor embodying the invention, with a part broken away and in association at one end with means for supplying molten glass in continuous sheet form thereto, and Fig. 2 is an enlarged cross-section on the line 2—2 in Fig. 1.

The conveyor apron embodying the present invention is of the endless belt type and designated 1. It is guided in its travel by end rolls 2 and 3 and by a plurality of intermediate idler rolls 4, all of which rolls are carried by a suitable frame 5. Either one of the end rolls 2, 3 may act as the drive roll for the belt.

The conveyor apron 1 is preferably of woven wire form with the mesh thereof sufficiently fine so that the semi-plastic glass sheet after passing from the forming rolls is prevented from being marked by the belt wires. By using an apron of this character a more uniform cooling of the undersurface of the sheet glass with the upper surface is obtained than is possible with the belt which is not of open mesh formation and which, therefore, more effectually prevents radiation of heat from the undersurface of the glass sheet. The wire mesh form of apron permits a more or less free circulation of air in contact with the under-surface of the conveying sheet and better product is obtained by reason of the substantially uniform cooling of the two surfaces of the sheet before passing into the leer. The portions of the apron which contact with the glass prevent any retardation of the cooling of such portions due to the small points of contact and to the rapid heat conductivity of the metal forming the apron. The rolls 4 of the conveyor means, which rolls support the upper run of the apron 1, are disposed quite close together, especially at the receiving end of the conveyor, so as to prevent any sagging of the belt between the rolls before the sheet of glass 6 received from a forming source and conveyed by the apron has become set sufficiently to maintain its shape.

The conveyor apron is shown in the present instance in connection with a means for forming a continuous glass sheet 6 and comprises a truck 7 mounted on wheels adapted to be moved into or out of operative relation to the conveyor and carrying a pair of shaping rolls 8 between which the glass passes and is rolled into sheet form. The glass passes from the rolls down a guide 9 to the surface of the conveyor. The truck 7 is also shown as carrying a receptacle 10 for molten glass, such receptacle being mounted for tilting movements to adapt the glass to be poured therefrom between the rolls, as indicated. The rolls 8 may be driven in any suitable manner.

It will be understood that the invention is not limited to any specific construction, arrangement or form of the parts, as it is capable of numerous changes and modifications without departing from the spirit of the claims.

What I claim is:—

1. In combination, means for forming molten glass into predetermined shape, and conveying means including a conveying belt of woven wire fabric for receiving the ware directly in contact therewith as it leaves the forming means and while in soft unset condition, said fabric being of fine open mesh construction to prevent marring of the unset ware by contact therewith and to permit uniform cooling of the ware.

2. In combination, means for forming molten glass into sheet form and permitting an advance of the sheet as it is formed, and conveying means including a conveying belt of woven wire fabric for receiving the sheet directly in contact therewith as it leaves the forming means and while in soft unset condition, said wire fabric being of fine open mesh construction to minimize marring of the soft unset sheet in contact therewith and to permit uniform cooling of the sheet.

In testimony whereof I have hereunto signed my name to this specification.

IVAL G. FOWLER.